(12) United States Patent
Karnjate et al.

(10) Patent No.: US 8,172,338 B2
(45) Date of Patent: May 8, 2012

(54) METHOD FOR SHUTDOWN OF VEHICLE BRAKES

(75) Inventors: Timothy M. Karnjate, Grand Blanc, MI (US); William K. Manosh, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1365 days.

(21) Appl. No.: 11/760,910

(22) Filed: Jun. 11, 2007

(65) Prior Publication Data

US 2008/0305932 A1 Dec. 11, 2008

(51) Int. Cl.
*B60T 13/74* (2006.01)
*B60T 15/14* (2006.01)

(52) U.S. Cl. .. 303/3; 303/113.3; 303/113.4; 303/DIG. 1

(58) Field of Classification Search ................ 303/3, 11, 303/15, 113.4, 115.1, 115.2, 116.1, 116.2, 303/119.1, DIG. 1, DIG. 2, 9.62, 113.3; 188/358
See application file for complete search history.

(56) References Cited

U.S. PATENT DOCUMENTS

| | | | | |
|---|---|---|---|---|
| 5,609,401 A | * | 3/1997 | Johnston et al. | 303/155 |
| 5,988,769 A | * | 11/1999 | Inagaki et al. | 303/117.1 |
| 6,007,160 A | * | 12/1999 | Lubbers et al. | 303/114.1 |
| 6,183,050 B1 | * | 2/2001 | Ganzel | 303/114.1 |
| 6,557,951 B1 | | 5/2003 | Frentz et al. | |
| 2008/0265662 A1 | * | 10/2008 | Karnjate et al. | 303/3 |

FOREIGN PATENT DOCUMENTS

WO   WO-2005005214 A1 *   1/2005

\* cited by examiner

*Primary Examiner* — Melody Burch

(57) ABSTRACT

At vehicle startup and vehicle shutdown, the driver modulates the brake pressure directly by depressing the brake pedal and the driver feels pedal resistance. During normal conditions of vehicle operation after vehicle startup, pressure boosted actuation of the vehicle brakes is provided by the modulation of boosted pressure from an accumulator via a boost valve operable in response to brake pedal depression, while an isolation valve isolates the pedal from direct influence by the brake pressure and the driver feels pedal resistance provided by a pedal simulator. Upon shutdown of boosted actuation, the boost valve reduces the brake pressure gradually over a calibrated period of time until the brake pressure substantially equals the pedal resistance then felt by the driver. Then the isolation valve reestablishes driver's feel of the brake pressure without an abrupt change in pedal resistance upon the reversion from boosted actuation to hydraulic unboosted actuation.

14 Claims, 2 Drawing Sheets

METHOD FOR SHUTDOWN OF VEHICLE BRAKES

FIELD OF THE INVENTION

The present invention relates to the shutdown of a vehicle boosted brake system and more particularly a method for avoiding pedal disturbance during shutdown of boosted brake actuation.

BACKGROUND OF THE INVENTION

Traditional unboosted hydraulic-mechanical brake systems include a master cylinder that is connected via hydraulic lines with individual brake cylinders at each of the wheels to operate the vehicle wheel brake at that wheel. When the driver presses on the brake pedal, a master cylinder connected to the brake pedal pressurizes the hydraulic fluid, and the pressure is communicated through the hydraulic lines to operate the brake cylinders at the wheel brakes. The brake pressure resists the travel of the brake pedal, so that the driver directly feels the brake actuation.

It is also known to operate the vehicle brakes via an electro-hydraulic booster system in which the hydraulic pressure for operating the brake cylinders is provided by a hydraulic pressure accumulator that is charged by a hydraulic pump. In a typical electro-hydraulic system, pressing on the brake pedal will actuate a switch or sensor to energize an electrical controller that controls a boost valve to release pressure from the accumulator for communication through the hydraulic lines to operate the brake cylinders at the wheel brakes.

It has been recognized that an electro-hydraulic system is dependent upon a fault-free electrical and hardware system, and accordingly Federal Motor Vehicle Safety Standard 135 sets requirements to ensure safe braking performance during both normal conditions and emergency conditions. Thus, it is known in the design of electro-hydraulic brake booster systems to retain the use of a master cylinder as a back-up for the electro-hydraulic hydraulic pressure source. Typically then, upon the occurrence of a fault in the electro-hydraulics, or a switching off of the ignition key while the vehicle has not yet been shifted to park, the braking will immediately revert to the traditional unboosted hydraulic braking by reestablishing hydraulic fluid communication between the master cylinder and the wheel cylinders. Additionally, modern vehicles, particularly large trucks and luxury vehicles have many electrical systems drawing electrical current and it is accordingly necessary to shutdown these electrical systems, including the electro-hydraulic braking system quickly in response to turning off of the ignition key, so that the battery charge is not unduly drained.

In some instances, upon shutdown of the boosted brakes, and reversion to the unboosted hydraulic braking, the abrupt reestablishment can result in an abrupt feedback of the hydraulic pressure at the wheel brakes into the master cylinder and the brake pedal, disturbing the driver.

It would be desirable to provide improvements in the electro-hydraulic brake systems so that the transition from boosted electro-hydraulic control to unboosted master cylinder control will remain transparent to the driver.

SUMMARY OF THE INVENTION

A method for controlling vehicle brakes includes providing hydraulic unboosted actuation of the vehicle brakes at both vehicle startup and vehicle shutdown. During hydraulic unboosted actuation, the driver modulates the brake pressure directly by depressing the brake pedal to operate a master cylinder, and the driver feels the brake pressure as pedal resistance. During normal conditions of vehicle operation after vehicle startup, pressure boosted actuation of the vehicle brakes is provided by the modulation of hydraulic pressure from an accumulator, via an electrically controlled boost pressure valve operable in response to at least one sensor sensing brake pedal depression by the driver. During the pressure boosted actuation, the pedal is isolated from direct influence by the brake pressure and instead the driver feels pedal resistance provided by a simulator that simulates a pedal resistance in proportion to the depression of the brake pedal. Upon shutdown of the boosted actuation of the vehicle brakes, the electrically controlled boost valve operates in a manner to ramp down the brake pressure gradually over a calibrated period of time until the brake pressure substantially equals the simulator provided pedal resistance then felt by the driver, and then the hydraulic unboosted actuation of the vehicle brakes is restored and the driver again feels the brake pressure as pedal resistance. In this way, by substantially equalizing the pressures, the driver is not disturbed by an abrupt change in pedal resistance upon the reversion from boosted actuation to hydraulic unboosted actuation at shutdown.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, application, or uses.

Figure 1:
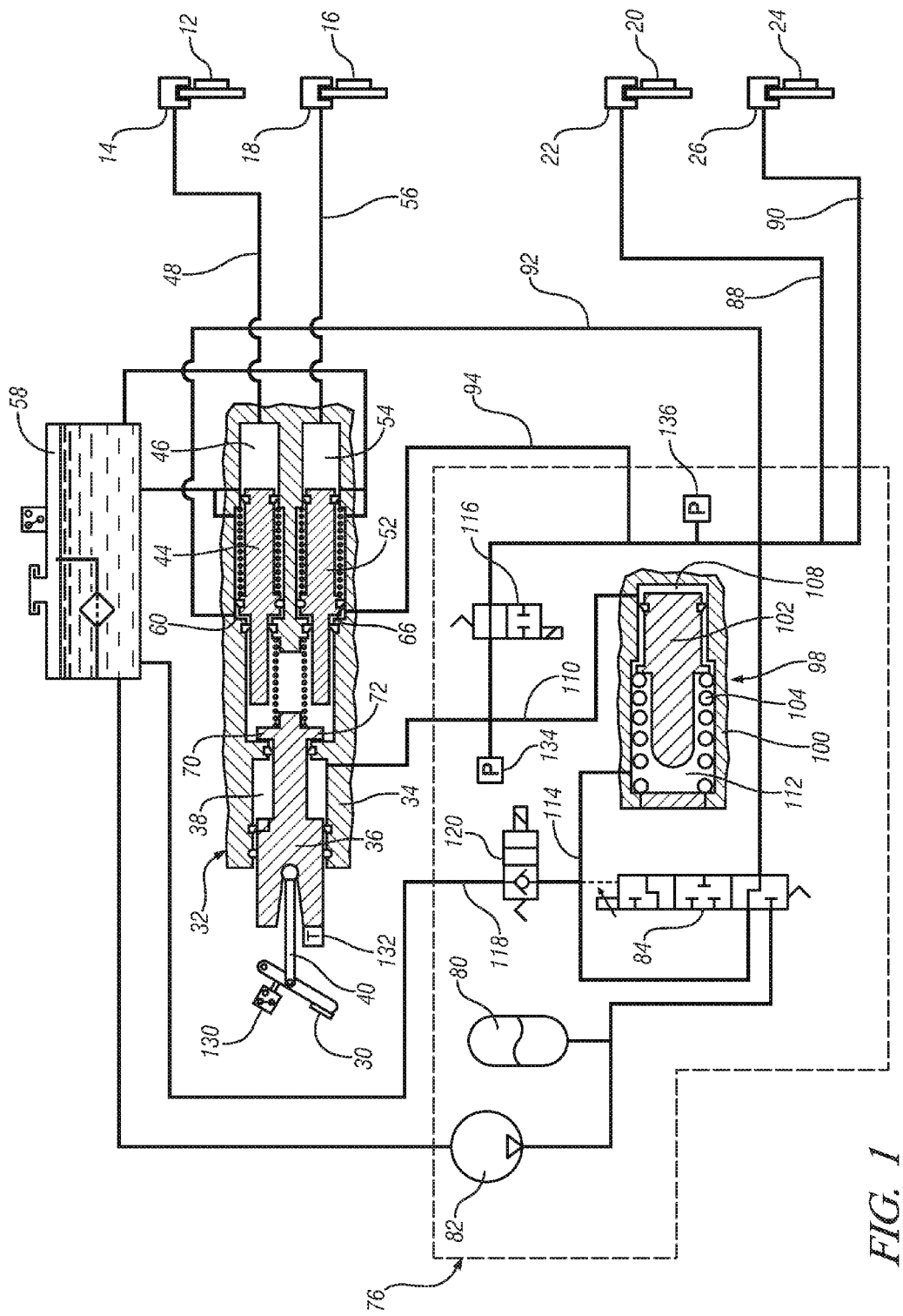
FIG. 1 is a schematic of the brake system.

Referring to FIG. 1, a motor vehicle has a right front wheel brake 12 with a brake cylinder 14, a left front wheel brake 16 with a brake cylinder 18, has a right rear wheel brake 20 with a brake cylinder 22, and a left rear wheel brake 24 with a brake cylinder 26.

The vehicle braking system shown in FIG. 1 also includes a brake pedal 30 and a master cylinder assembly 32. Master cylinder assembly 32 includes a housing 34 in which a primary piston 36 slides and defines a primary piston chamber 38. A push rod 40 is connected to the brake pedal 30 and to the primary piston 36 so that the primary piston 36 and the brake pedal 30 will move together. The master cylinder assembly 32 also includes a slidable right front piston 44 that defines an output chamber 46 connected to the right front brake cylinder 14 by a hydraulic line 48 and a slidable left front piston 52 that defines an output chamber 54 connected to the left front brake cylinder 18 by hydraulic line 56. The master cylinder assembly 32 includes a fluid reservoir 58 that provides hydraulic fluid to the system when needed and receives hydraulic fluid from the system when not needed.

The right front piston 44 and housing 34 defines a boost chamber 60 on the left side of the right front piston 44 for receiving hydraulic pressure from an accumulator, as will be discussed hereinafter, to urge the right front piston 44 rightwardly to push hydraulic fluid out of the output chamber 46 to operate the brake cylinder 14 of the right front wheel brake 12. Similarly, the left front piston 52 and housing 34 define a boost chamber 66 on the left side of the left front piston 52 for receiving hydraulic pressure from an accumulator, as will be discussed hereinafter, to urge the left front piston 52 rightwardly to push hydraulic fluid out of the output chamber 54 to operate the wheel cylinder 18 of the left front brake 16.

The right hand end of the primary piston 36 carries arms 70 and 72 that will engage with the left ends of the right front piston 44 and the left front piston 52 to provide a direct mechanical connection between the brake pedal 30 and the pistons 44 and 52 under certain conditions, as required by Federal Motor Vehicle Safety Standard 135, but which need not be discussed further in this description.

An electro-hydraulic control unit, generally indicated at 76, is provided for providing hydraulic pressure to the boost chambers 60 and 66 of the master cylinder assembly 32 during normal operation of the vehicle brake system, in response and in proportion to the force applied to the brake pedal 30 by the driver.

A hydraulic fluid accumulator 80 stores pressurized hydraulic fluid that is provided to it by a hydraulic pump 82. A brake boost control valve 84 releases hydraulic fluid from the accumulator 80, and the hydraulic pressure is communicated to the rear brake cylinders 22 and 26 via hydraulic lines 88 and 90 to apply rear wheel brakes 20 and 24, and to the boost chambers 60 and 66 of the master cylinder 32 by hydraulic lines 92 and 94 where the pistons 44 and 52 will be forced rightwardly to push hydraulic fluid to the front brake cylinder 14 and 18 to apply wheel brakes 12 and 16.

A pedal simulator, generally indicated at 98, includes a housing 100 in which simulator piston 102 is slidable, and has a spring 104 urging the simulator piston 102 rightwardly. A chamber 108 on the right side of the simulator piston 102 is connected to the primary piston chamber 38 by hydraulic line 110. A chamber 112 on the left side of the pedal simulator 98 is connected by hydraulic line 114 to the brake boost valve 84. Additional on-off solenoid isolation valve 116 is operable to either connect or isolate the primary piston chamber 38 and pedal simulator chamber 108 to the hydraulic lines 88, 90, 92 and 94. Another on-off solenoid valve 120 is operable to either connect or isolate the pedal simulator chamber 112 and boost control valve 84 to the reservoir 58 via a hydraulic line 118.

The boost control valve 84 is a spool valve that is controlled by a electric signals received from an electronic control module, not shown in the drawings. The electronic control module receives inputs from various vehicle systems, and from a force sensor 130 on the brake pedal 30, a travel sensor 132 provided on the primary piston 36, a pressure sensor 134 provided in the primary piston chamber 38 and simulator chamber 108, and a brake pressure sensor 136 provided in the hydraulic lines 88, 90, 92 and 94.

OPERATION

Vehicle Start Up—No Boost Manual Brakes

In modern vehicles, the ignition must be turned on and the brake pedal 30 must be depressed in order to unlock the shift lever so that the transmission can be shifted from park. When the driver presses on the pedal 30, hydraulic fluid is pushed out of the primary piston chamber 38. As shown in FIG. 1, isolation valve 116 is open and valve 84 is open, and valve 120 is closed, so that the pressure from the primary piston chamber 38 will be acting in both chambers 108 and 112 of the pedal simulator 98 to hydraulically lock the simulator piston 102 against movement. Accordingly, pedal induced pressure in the primary piston chamber 38 flows through open isolation valve 116 directly to the brake cylinders 22 and 26 and to the master cylinder chambers 60 and 66 to displace the pistons 44 and 52 and push hydraulic fluid from the output chambers 46 and 54 to the front wheel cylinders 14 and 18. Thus the driver is able to modulate braking pressure directly with pedal force and travel, with no boost from the accumulator 80.

Propulsion Ready—Full Boost Brakes

Once the engine is cranked, the vehicle is capable of propulsion and all electrical systems are powered. Accordingly it is desirable to have full boosted brake capability. The isolation valve 116 will close to isolate the primary piston chamber 38 from the brake cylinders 22 and 26 and the valve 120 will open the left side simulator chamber 112 to the reservoir 58. Thus, as the driver pushes the pedal 30, the pedal simulator piston 102 can shift leftwardly against the spring 104 so that the driver will feel the force of the simulator spring 104 as he applies force to the pedal 30.

The electronic control module, not shown, processes inputs from the brake pedal force sensor 130 and travel sensor 132, and from the pressure sensor 134 that monitors the primary piston chamber 38 and simulator chamber 108, to perform a driver braking intent algorithm and manage the brake boost valve 84 to modulate the communication of hydraulic pressure from accumulator 80 to the hydraulic lines 88, 90, 92 and 94. In particular, if the braking pressure in lines 88, 90, 92 and 94 exceeds the braking demand, the brake boost valve 84 will shift to the position shown in FIG. 1 to cut off the accumulator 80 and dump pressure back through the open solenoid valve 120 to the reservoir 58. If the braking pressure in lines 88, 90, 92 and 94 is less than the braking demand, the brake boost valve 84 will shift to open the flow from the accumulator 80 and shut off the flow back to the reservoir 58.

Vehicle Power Down

If and when the vehicle is powered down, either by turning off the ignition switch or by a malfunction, the electronic control unit will immediately cause the brake system to revert from the electro-hydraulic boosted state to the no boost manual brakes by restoring the valves to the positions shown in FIG. 1. That is, the boost valve 84 will close off communication with the accumulator 80, the solenoid valve 120 will close to lock fluid in the simulator chamber 112 so that the pedal simulator piston 102 is locked against movement, and the solenoid isolation valve 116 is opened to establish fluid communication between the boosted pressure in lines 88, 90, 92 and 94 and the primary piston chamber 38.

The result is that if the boosted pressure in lines 88, 90, 92, and 94, as measured by the pressure sensors 136, exceeds the pressure in the primary piston chamber 38, as measured by the pressure sensor 134, the hydraulic pressure will kick the pedal 30. If the driver has his foot on the brake pedal 30, the driver will feel the pedal kick and be disturbed.

Figure 2:
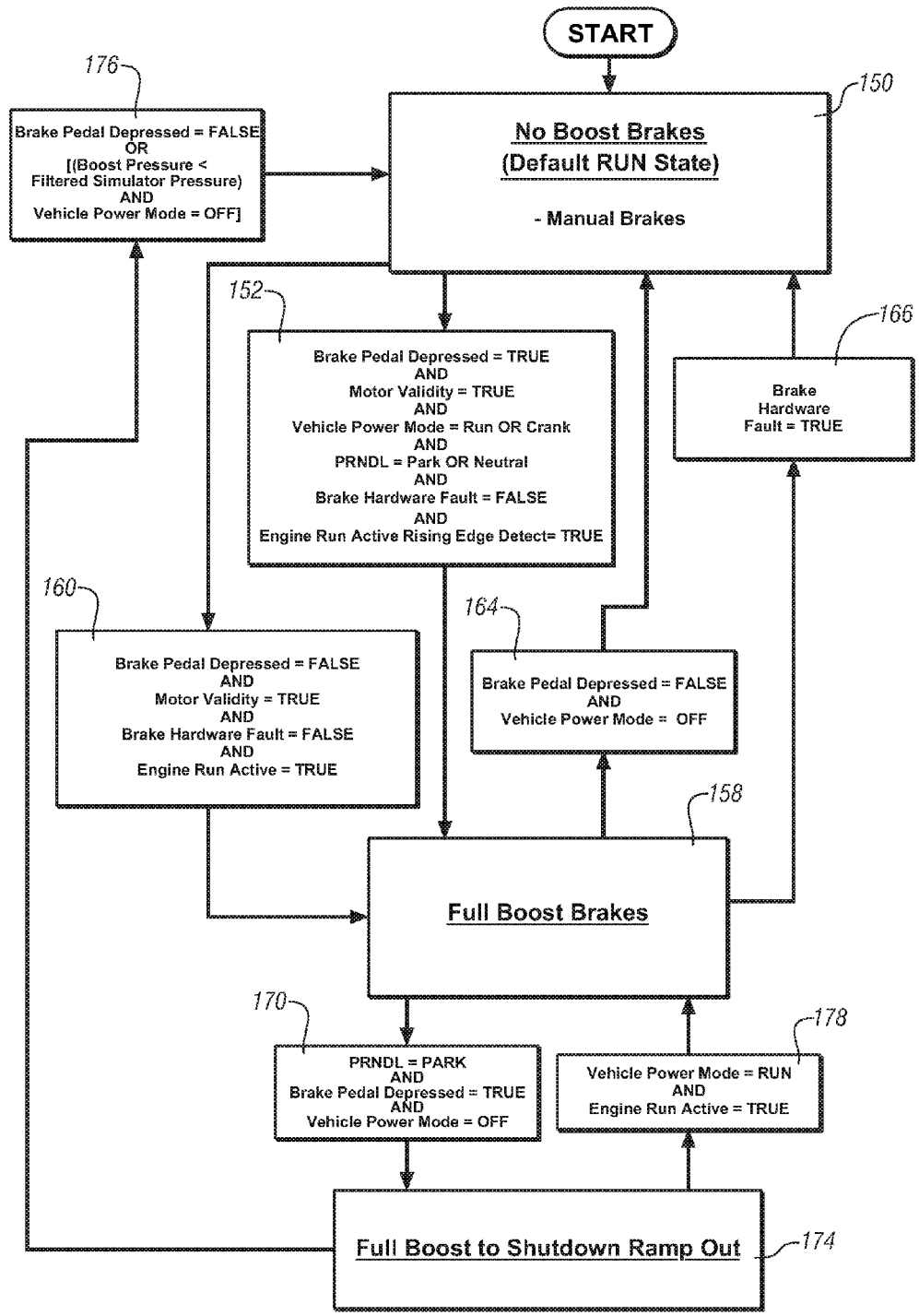
FIG. 2 is a flow chart of the brake system operation.

Accordingly, we have developed an algorithm for managing the shutdown of the braking system. Referring to FIG. 2, a flow chart is shown for the shutdown algorithm.

Box 150 shows the condition at vehicle start up where the brakes are unboosted, that is, the valves are positioned as described above in Vehicle Start Up—No Boost Manual Brakes.

In the step labeled 152, the propulsion readiness of the vehicle is evaluated. The driver depresses the brake pedal, and a number of conditions are checked, such as determining that the hydraulic pump 82 is powered, and checking that the brake hardware and electrical controls are free of faults, engine is cranking or running, etc. If the vehicle is propulsion ready, valves are shifted to the position described above in Propulsion Ready—Full Boost Brakes. Thus, the brake system is in the boosted condition shown in Box 158. Step 160 allows the driver to have his foot off the brake, and maintains the brake system in the boosted condition of Box 158.

Step 164 shows that if the vehicle loses power, either by turning off the ignition or through other cause, the brakes will revert to no boost manual condition at Box 150. Likewise, at step 166, if a fault is sensed in the brake system, the brakes will revert to the no boost manual condition of Box 150.

Step 170 shows that if the brake pedal is depressed and the vehicle power is turned off with the vehicle in Park, the electro-hydraulic control unit enters a shutdown ramp out condition at Box 174 in which pedal disturbance that would otherwise occur is eliminated or reduced to a minimum to avoid disturbing the drivers foot. In particular, the electronic control unit will compare the boosted pressure in lines 88, 90, 92, and 94, as measured by the pressure sensor 136, with the primary chamber pressure in the primary piston chamber 38, as measured by the pressure sensor 134. If the boosted pressure exceeds the primary chamber pressure, then the boost control valve 84 will be managed in a way to reduce the boosted pressure over a calibrate-able period of time, for example 16 seconds, until the boosted pressure substantially equals the primary chamber pressure in the primary piston chamber 38.

At step 176, upon reaching substantially equal pressure, or the boost pressure being less than the primary chamber pressure, the isolation valve 116 will open, and because the boost pressure at pressure sensor 136 now substantially equals the primary pressure chamber at pressure sensor 134, the driver will not experience a pedal disturbance. In addition, if during the calibrate-able ramp out time period the driver essentially equalizes the boost pressure and primary chamber pressure by releasing the brake pedal, the brake system will transition at once to the no boost state at Box 150. Step 176 also shows that if the brake pedal is not depressed, the brakes can be returned to the no boost condition as the pedal disturbance will not affect the driver because the driver does not have his foot on the pedal.

Step 178 shows that if at any point during the time calibrate-able ramp out time period, vehicle power is restored and the engine is running, such as the driver restarting the vehicle, the brake system will immediately terminate the ramp out algorithm at Box 174 and transition back to the boosted brake state at Box 158.

The foregoing description of the invention is merely exemplary in nature and, thus, variations thereof are intended to be within the scope of the invention. For example, although the afore described power down algorithm is described above as if used in a combustion engine, the brake system and this algorithm can also be used in battery powered vehicles or hybrid vehicles. Accordingly, although the above description uses terms like engine crank to describe the condition in which vehicle propulsion is available, other vehicle readiness conditions will be sensed and substituted into the algorithm in the case of battery powered and hybrid powered vehicles.

Likewise, the person of ordinary skill will recognize that the intent of the power down algorithm is to substantially reduce the occurrence of a pedal kick that would disturb the occupant. Accordingly, the comparison of boost pressure with primary chamber pressure is not strictly limited to waiting for the exact equality between the boost pressure and primary chamber pressure, but rather the intent is to get the boost pressure and the primary chamber pressure close enough that the pedal kick is so reduced in magnitude that the driver will not be disturbed.

What is claimed is:

1. A method of controlling vehicle brakes comprising:
   providing at vehicle startup and vehicle shutdown a hydraulic unboosted actuation of the vehicle brakes so that the driver modulates the brake pressure directly by depressing a brake pedal and the driver feels the brake pressure as pedal resistance;
   providing upon normal conditions of vehicle operation after vehicle startup for the boosted actuation of the vehicle brakes by the modulation of the brake pressure through an electrically controlled boost pressure valve operable in response to at least one sensor sensing brake pedal depression by the driver, during which period of boosted actuation the pedal is isolated from direct influence by the brake pressure and instead the driver feels pedal resistance provided by a simulator that simulates a pedal resistance in proportion to the depression of the brake pedal;
   upon shutdown of the boosted actuation of the vehicle brakes, operating the electrically controlled boost valve in a manner to reduce the brake pressure gradually over a calibrated period of time until the brake pressure substantially equals the pedal resistance then felt by the driver and then reestablishing the hydraulic unboosted actuation of the vehicle brakes whereby the driver is not disturbed by an abrupt change in pedal resistance upon the reversion from boosted actuation to hydraulic unboosted actuation;
   when after shutdown of the boosted actuation of the vehicle brakes by the vehicle shutdown and during the calibrated period of time, the driver ceases to depress the pedal and thus would not experience a pedal disturbance, at once operating the electrically controlled boost valve to reestablish the hydraulic unboosted actuation of the vehicle brakes;
   when after shutdown of the boosted actuation of the vehicle brakes by the vehicle shutdown and during the calibrated period of time, the vehicle shutdown is terminated, aborting the gradual reduction of the brake pressure; and,
   when the vehicle brakes experience a fault, reverting at once from the boosted actuation to the hydraulic unboosted actuation without delay due to the calibrated period of time and irrespective of any occurrence of pedal disturbance.

2. The method of claim 1 in which the calibrated period of time is about 16 seconds.

3. The method of claim 1 further comprising providing the hydraulic unboosted actuation of the vehicle brake via a pedal operated master cylinder chamber that is hydraulically connected to the simulator, and sensing the hydraulic pressure occurring at the master cylinder chamber to determine the pedal resistance being experienced by the driver.

4. The method of claim 3 further comprising sensing the hydraulic pressure at the vehicle brakes and comparing the hydraulic pressure at the vehicle brakes with the pressure sensed at the master cylinder chamber to manage the control of the boost valve during reversion from boosted actuation to hydraulic unboosted actuation.

5. The method of claim 3 further comprising providing an isolation valve between the pedal operated master cylinder chamber and the vehicle brakes to selectively either open hydraulic communication between the pedal operated master cylinder chamber and the vehicle brakes to provide the hydraulic unboosted actuation or close off hydraulic communication between the pedal operated master cylinder chamber and the vehicle brakes during the boosted actuation of the vehicle brake by the operation of the boost valve.

6. The method of claim 1 further comprising providing a valve between the pedal operated master cylinder chamber and the vehicle brakes to selectively either open hydraulic communication between the pedal operated master cylinder chamber and the vehicle brakes to provide the hydraulic unboosted actuation or close off hydraulic communicate between the pedal operated master cylinder chamber and the vehicle brakes to provide the boosted actuation of the vehicle brake by the operation of the pressure boost valve.

7. The method of claim 1 further comprising:
providing the hydraulic unboosted actuation of the vehicle brake via a pedal operated master cylinder chamber that is hydraulically connected to the simulator;
providing the isolation of the pedal operated master cylinder chamber from the vehicle brakes by closing an isolation valve to close off hydraulic communication between the pedal operated master cylinder chamber and the vehicle brakes during the boosted actuation of the vehicle brake by the operation of the pressure boost valve;
sensing the hydraulic pressure occurring at the master cylinder chamber to determine the pedal resistance being experienced by the driver;
sensing the hydraulic pressure occurring at the vehicle brakes to determine the pedal resistance that would be experienced by the driver upon re-opening communication between the pedal operated master cylinder chamber and the vehicle brakes;
then controlling the boost valve in a manner to reduce the pressure sensed at the vehicle brakes and then reestablishing the hydraulic unboosted actuation of the vehicle brakes by opening the isolation valve when the sensed pressure at the vehicle brakes substantially equals the sensed pressure at the master cylinder chamber.

8. The method of claim 1 further comprising providing a valve between the pedal operated master cylinder chamber and the vehicle brakes to selectively either open hydraulic communication between the pedal operated master cylinder chamber and the vehicle brakes to provide the hydraulic unboosted actuation or close off hydraulic communicate between the pedal operated master cylinder chamber and the vehicle brakes during the boosted actuation of the vehicle brake by the operation of the pressure boost valve.

9. A method for controlling vehicle brakes comprising:
providing a pedal driven primary piston that pressurizes hydraulic fluid for no-boost manual actuation of the vehicle brakes in proportion to pedal travel so that the driver feels pedal resistance in proportion to pedal travel;
providing a source of pressure boosted hydraulic fluid;
selectively closing off communication of the hydraulic fluid between the vehicle brakes and the primary piston and opening communication of the pressure boosted hydraulic fluid to the vehicle brakes to provide pressure boosted actuation of the vehicle brakes;
providing a spring loaded simulator in hydraulic fluid communication with the primary piston to provide spring induced resistance to the pedal driven primary piston in proportion to the force exerted on the pedal while the communication of hydraulic fluid between the vehicle brakes and the primary piston is closed off so that the driver feels resistance in proportion to pedal travel even though the primary piston is isolated from the pressure at the wheel brakes;
and upon a shutdown of pressure boosted actuation of the vehicle brakes, comparing the boosted pressure at the vehicle brakes with the simulator provided pressure provided on the pedal, and
reopening communication of the hydraulic fluid between the vehicle brakes and the primary piston and closing communication of the pressure boosted hydraulic fluid to the wheel brakes when the boosted pressure and simulator pressure are sufficiently equal that the driver will not experience a pedal disturbance;
when the boosted pressure exceeds the simulator pressure to a magnitude that would create a pedal disturbance, reducing the boosted pressure over time until the boosted pressure and simulator pressure are substantially equal and then reopening communication of the hydraulic fluid between the vehicle brakes and the primary piston and closing communication of the pressure boosted hydraulic fluid to the wheel brakes,
when upon a shutdown of pressure boosted actuation of the vehicle brakes by a shutdown of the vehicle, the driver is not depressing the pedal or releases the pedal, reopening communication of hydraulic fluid between the primary piston and the vehicle brakes without delay as the driver cannot be disturbed by any pedal disturbance when the driver is not depressing the brake pedal; and
when there is a fault in the vehicle brakes, reopening communication of hydraulic fluid between the primary piston and the vehicle brakes without delay irrespective of the possibility of a pedal disturbance.

10. The method of claim 9 further comprising a first pressure sensor for sensing the simulator provided hydraulic pressure at the primary piston and a second pressure sensor for sensing the boosted hydraulic pressure at the wheel brakes, and then comparing these sensed pressures.

11. The method of claim 9 further comprising said source of pressure boosted hydraulic fluid being a hydraulic accumulator and an electrically controlled boost valve operable in response to at least one sensor sensing brake pedal depression by the driver to selectively apply and release the pressure boosted hydraulic fluid to the vehicle brake.

12. The method of claim 11 further comprising:
comprising providing an isolation valve between the pedal operated master cylinder chamber and the vehicle brakes to selectively either open hydraulic communication between the primary piston and the vehicle brakes to provide the hydraulic unboosted actuation or close off hydraulic communicate between the primary piston and the vehicle brakes during the boosted actuation of the vehicle brake by the operation of the pressure boost valve.

13. A method for controlling a vehicle brakes comprising:
providing no boost manual braking at vehicle start up and vehicle shutdown via a master cylinder having a pedal driven primary piston that pressurizes hydraulic fluid in a primary piston chamber and furnishes the pressurized hydraulic fluid to the wheel brakes, with the driver feeling the hydraulic pressure as pedal resistance;

providing pressure boosted braking during normal running operation of the vehicle by closing an isolation valve to cut off the communication of primary piston chamber from the wheel brakes and then modulating boosted hydraulic pressure from an accumulator to the vehicle brakes, with the driver feeling hydraulic pressure provided to the primary piston chamber by a pedal simulator spring to simulate a pedal resistance in proportion to the boosted pressure at the wheel brakes;

and, upon vehicle shutdown or brake system fault during pressure boosted braking, comparing the pressure at the primary piston chamber with the boosted pressure at the vehicle brakes, and operating the boost valve to ramp down the boosted pressure to the primary piston chamber pressure over a period over a period of time, and then when the primary chamber pressure and the boosted pressure are substantially equal, reopening the isolation valve to restore the direct communication between the primary piston chamber and the wheels brakes without disturbing the pedal;

when upon vehicle shutdown during pressure boosted braking, the driver is not depressing the pedal or releases the pedal, reopening communication of hydraulic fluid between the primary piston chamber and the vehicle brakes during the ramp down as the driver cannot be disturbed by any pedal disturbance when the driver is not depressing the brake pedal; and, when there is a fault in the vehicle brakes, reopening communication of hydraulic fluid between the primary chamber and the vehicle brakes during the ramp down irrespective of the possibility of a pedal disturbance.

14. The method of claim 13 further comprising the time period being a calibrate-able time period of about 16 seconds.

* * * * *